(12) United States Patent
Ahmed et al.

(10) Patent No.: US 11,552,963 B2
(45) Date of Patent: Jan. 10, 2023

(54) RELATIVE VOLTAGE PATTERN FOR ELECTRONIC CONTROL UNIT IDENTIFICATION

(71) Applicant: Intel Corporation, Santa Clara, CA (US)

(72) Inventors: Shabbir Ahmed, Beaverton, OR (US); Marcio Juliato, Portland, OR (US); Christopher Gutierrez, Hillsboro, OR (US); Manoj Sastry, Portland, OR (US); Liuyang Yang, Portland, OR (US); Xiruo Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 459 days.

(21) Appl. No.: 16/720,664

(22) Filed: Dec. 19, 2019

(65) Prior Publication Data

US 2020/0128030 A1    Apr. 23, 2020

(51) Int. Cl.
| H04L 12/40 | (2006.01) |
| H04L 9/40 | (2022.01) |
| G06F 21/55 | (2013.01) |
| G07C 5/08 | (2006.01) |
| H04W 4/40 | (2018.01) |
| G07C 5/00 | (2006.01) |

(52) U.S. Cl.
CPC ........ *H04L 63/1416* (2013.01); *G06F 21/554* (2013.01); *G07C 5/008* (2013.01); *G07C 5/085* (2013.01); *H04L 12/40013* (2013.01); *H04L 12/4015* (2013.01); *H04W 4/40* (2018.02); *H04L 2012/40215* (2013.01); *H04L 2012/40273* (2013.01)

(58) Field of Classification Search
CPC ........... H04L 63/1416; H04L 12/40013; H04L 2012/40215
See application file for complete search history.

(56) References Cited

U.S. PATENT DOCUMENTS

| 10,750,336 | B2 * | 8/2020 | Mendes | H04W 4/44 |
| 2017/0318044 | A1 * | 11/2017 | Dagmi | H04L 43/10 |
| 2018/0248766 | A1 * | 8/2018 | Ezra | H04L 63/1416 |
| 2020/0296015 | A1 * | 9/2020 | Imamoto | H04L 61/00 |
| 2020/0309838 | A1 * | 10/2020 | Cha | B60R 16/0232 |
| 2021/0176246 | A1 * | 6/2021 | Chapman | H04L 12/40013 |

* cited by examiner

*Primary Examiner* — Fahmida S Chowdhury
(74) *Attorney, Agent, or Firm* — KDB Firm PLLC

(57) ABSTRACT

Systems, apparatuses, and methods to identify an electronic control unit transmitting a message on a communication bus, such as an in-vehicle network bus, are provided. ECUs transmit messages by manipulating voltage on conductive lines of the bus. Observation circuitry can observe voltage transitions associated with the transmission at multiple points on the in-vehicle network bus. A voltage waveform can be generated from the observed voltage transitions. ECUs can be identified and/or fingerprinted based on the generated waveforms.

24 Claims, 13 Drawing Sheets

752-5

752-6

RELATIVE VOLTAGE PATTERN FOR ELECTRONIC CONTROL UNIT IDENTIFICATION

TECHNICAL FIELD

Embodiments described herein generally relate to identification of electronic control units on a network, and more specifically, to identifying electronic control units on an in-vehicle network.

BACKGROUND

Modern automobiles include a number of sensors, controllers, and processors. These devices often communicate signals and/or messages via a common bus. For example, an in-vehicle network (IVN) can be used to send messages between devices in a vehicle. Identification of the device transmitting a message is important for an overall intrusion detection system (IDS). An IDS may be used to reduce risk of attacks aimed to disable, overtake, reprogram, or otherwise inhibit the safe operation of the system in which the network is deployed, such as, an automobile.

BRIEF DESCRIPTION OF THE DRAWINGS

In the drawings, which are not necessarily drawn to scale, like numerals may describe similar components in different views Like numerals having different letter suffixes may represent different instances of similar components. The drawings illustrate generally, by way of example, but not by way of limitation, various embodiments discussed in the present document.

DETAILED DESCRIPTION

Figure 1:
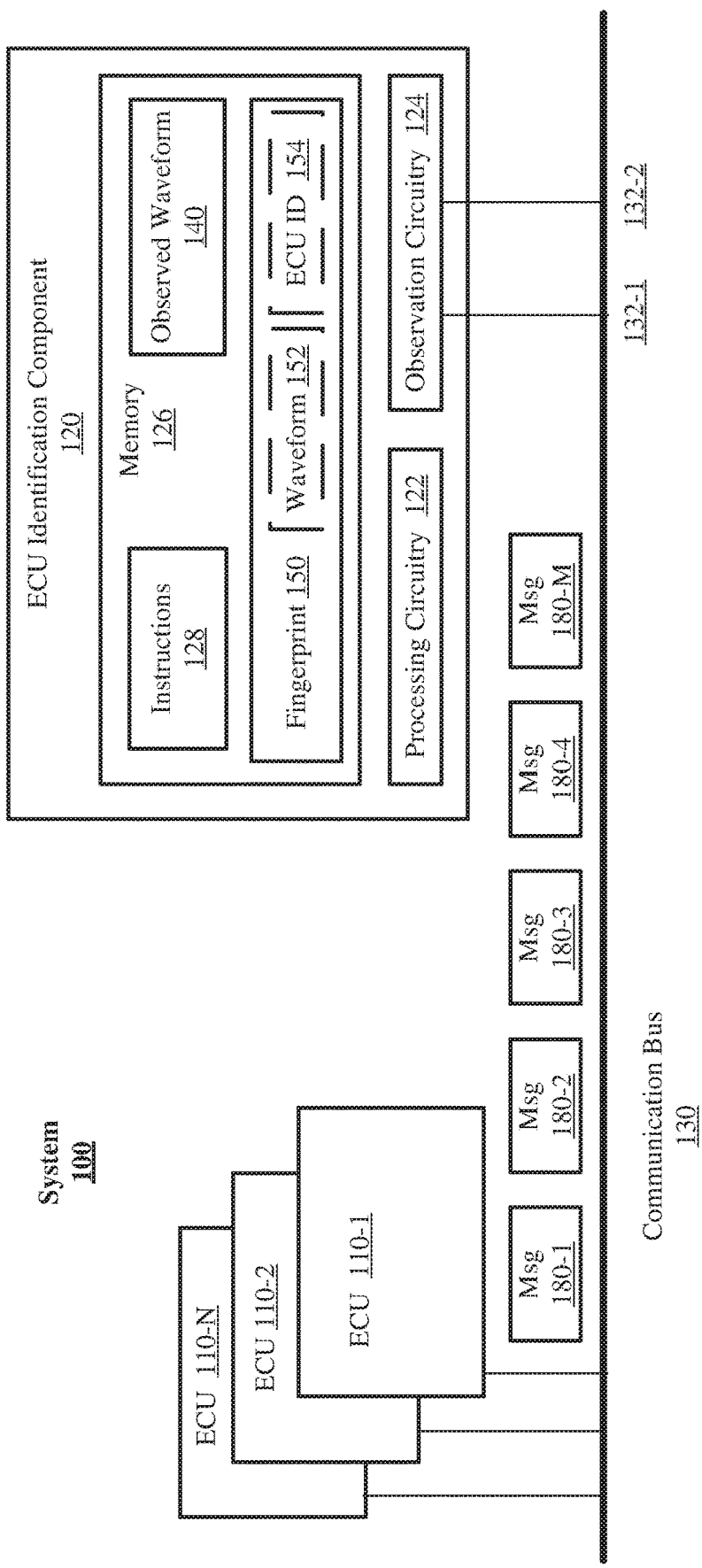
FIG. 1 illustrates a system for ECU identification.

Various embodiments of the present disclosure are directed to providing an identity of transmitters of messages on a communication bus. In general, the present disclosure can be applied to a variety of communication busses, which can be implemented in many different contexts, such as, for example, industrial networks, vehicular networks, manufacturing networks, retail operation networks, warehousing networks, or the like. Although vehicular networks are often used in this description as an example implementation, the claims are not limited to networks implemented in a vehicle. However, using vehicles as an example, modern vehicles have many (often hundreds) of electronic control units (ECUs) for various subsystems. For example, there are multiple ECUs for engine control, transmission, airbags, antilock braking, cruise control, electric power steering, audio systems, power windows, power doors, power mirror adjustment, battery, recharging systems for hybrid/electric cars, environmental control systems, auto start stop systems, blind spot monitoring, lane keeping assist systems, collision avoidance systems, and more complex systems in the case of autonomous, or semi-autonomous vehicles.

These ECUs generate data and/or commands and/or consume data and/or commands. For example, a collision avoidance ECU may need to consume data from ECU speed sensors and or an ECU object sensor (e.g., radar, a camera, or the like). Accordingly, the ECUs in an automobile are often communicatively coupled via an in-vehicle network (IVN).

To that end, this disclosure provides a new and improved scheme to identify the source of messages, for example, those communicated via an IVN. Specifically, this scheme describes an approach based on observing voltage transitions, such as, the rising, falling, and steady state transitions of the signal of the transmitting ECU. For instance, bits are communicated on the IVNs (e.g., controller area network (CAN) bus, a FlexRay bus, a CAN FD bus, an automotive ethernet bus, or a local interconnected network (LIN) bus, or the like) by voltage applied across a conductive line. In some examples, (e.g., CAN bus, or the like) multiple conductive lines are provided and a differential between the applied voltage on the conductive lines is used to convey bits.

The present disclosure provides to observe the voltage transitions (e.g., rising, falling, steady state, etc.) from multiple points on a bus and to combine the observed voltage transitions to form a two-dimensional (2D) waveform, which can be used to fingerprint ECUs.

It is noted that this provides a more robust scheme for ECU identification than conventional methods in that the present disclosure is less susceptible to electromagnetic interference (EMI), and particularly to low frequency EMI. In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

FIG. 1 illustrates an example system 100, which can be implemented in a vehicle, such as, for example, an automobile, a motorcycle, an airplane, a boat, a personal watercraft, an all-terrain vehicle, or the like. System 100 includes a number of electronic control units (ECUs) 110 and an ECU identification component 120, communicatively coupled via communication bus 130. In some examples, communication bus 130 can be a CAN bus a FlexRay bus, a CAN FD bus, an automotive ethernet bus, or a local interconnected network (LIN) bus. Additionally, where implemented in contexts outside of the automotive space, the communication bus 130 can be a network bus adapted to the particular implementation, such as, for example, a communication network for manufacturing equipment, or the like.

In general, ECUs 110 includes circuitry arranged to generate messages and transmit the messages onto communication bus 130 and/or consume messages from communication bus 130. ECUs 110 can be any of a variety of devices, such as, for example, sensor devices, actuator devices, microprocessor control devices, or the like. For example, ECUs 110 include circuitry arranged to manipulate voltage levels on communication bus (e.g., see FIG. 2) to communicate messages via the communication bus 130.

As depicted, system 100 includes ECUs 110-1 and 110-2 through 110-N, where N can be any positive integer. For example, in a modern automobile, hundreds of ECUs 110 may be provided in system 100. Messages 180-1, 180-2, and 180-3 through 180-M, where M can be any positive integer are depicted on communication bus 130. As noted above, ECUs are arranged to generate and/or consume messages, where the messages can include data or commands. However, many IVN standards do not provide for indicating source information on the bus. Furthermore, many IVN schemes do not have sufficient bandwidth for conventional cryptography techniques useful to indicate the source of messages 180.

ECU identification component 120 includes processing circuitry 122, observation circuitry 124, and memory 126. Memory 126 includes instructions 128 (e.g., firmware, or the like) that can be executed by processing circuitry 122 and/or observation circuitry 124. During operation, observation circuitry 124 can observe voltage levels on communication bus 130 at points 132-1 and 132-2 and generate observed waveforms 140 associated with messages 180. Said differently, for each messages 180, observation circuitry 124 can observe voltage on the bus at points 132-1 and 132-2 and can generate a 2D waveform (e.g., observed waveforms 140) from the observed voltages. In particular, observation circuitry 124 can observe voltage transitions on the communication bus 130 at two points (132-1, 132-2, or the like) and generate observed waveform 140 from a 2D representation of the observed voltages associated with each voltage transition. Example voltage transitions are described in greater detail below (see FIG. 4 and FIGS. 7A-7J), however, in general, a voltage transition can have a waveform associated with a rising edge, a falling edge, or a steady state transition. It is noted, that the term "voltage transition" is used throughout this disclosure and includes both rising and failing transitions as well as the steady state condition, which although not always considered a voltage "transition" is included in the term voltage transition and used to fingerprint an ECU 110 as described herein.

Processing circuitry 122, in executing instructions 128 can compare the observed waveform 140 to a waveform 152 from a fingerprint 150 to determine an identity of the ECU 110. With some examples, processing circuitry 122, in executing instructions 128 can determine the identity based on ECU ID 154 associated with the waveform 152 from fingerprint 150. In some examples, processing circuitry 122, in executing instructions 128 can compare the observed waveform 140 to a waveform 152 from a fingerprint 150 to determine an authenticity of an ECU 110 sending the message 180 associated with the observed waveform 140 (e.g., based on ECU ID 154, or the like). In some examples, observed waveform 140 can be compared to waveforms 152 from fingerprint 150 using machine learning, image recognition, or other signal processing algorithms. As a specific example, processing circuitry 122 in executing instructions 128 can compare observed waveform 140 to waveforms 152 using a machine learning model (e.g., a neural network, or the like) trained to classify observed waveforms as fingerprinted waveforms 152.

Furthermore, processing circuitry 122, in executing instructions 128 can be arranged to generate fingerprints 150. For example, processing circuitry 122 can execute instructions 128 to initialize generating fingerprints 150 (e.g., training) and can cycle through each ECU 110 to observe waveforms 152 associated with each ECU 110 and insert the waveform 152 along with an ECU identifier 154 into fingerprint 150. In some examples, processing circuitry 122 in executing instructions 128 can train a machine learning model to recognize waveforms 152 from observed waveform 140.

Processing circuitry 122 can include any of a variety of processors, such as, for example, commercial central processing units, application specific integrated circuits, or the like. Processing circuitry 122 can be a microprocessor or a commercial processor and can include one or multiple processing core(s) and can also include cache. Observation circuitry 124 can include circuitry such as, analog to digital converters, voltage measurement circuitry, voltage waveform observation circuitry (e.g., oscilloscope circuitry, or the like) arranged to observe voltage transitions and generate observed waveforms 150.

Memory 126 can be based on any of a wide variety of information storage technologies. For example, memory 126 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array).

Figure 2:
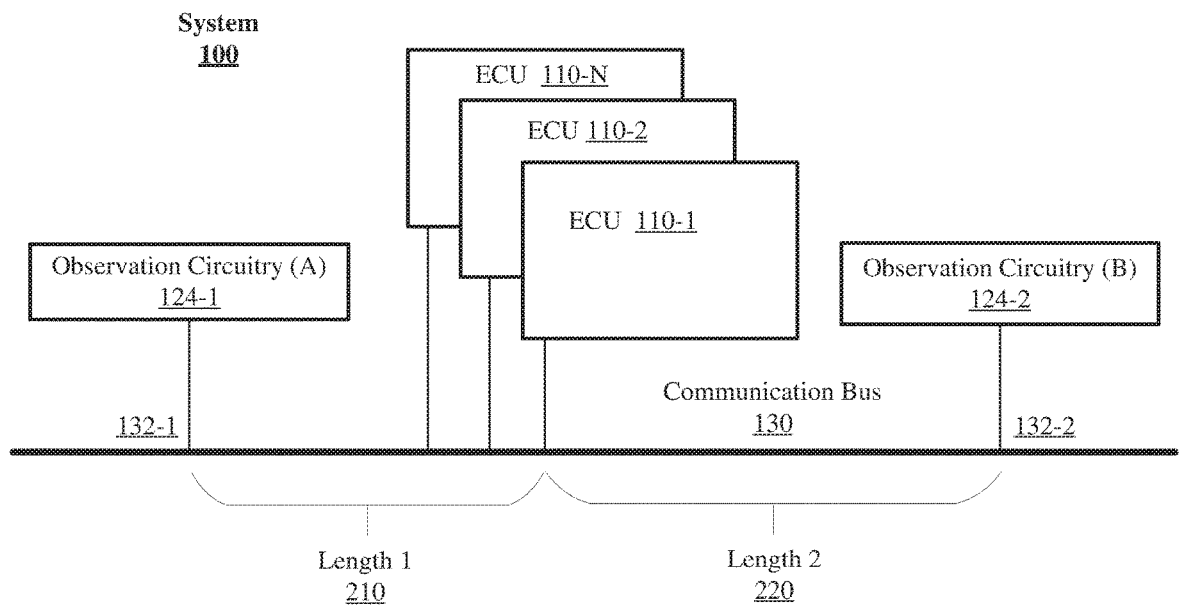
FIG. 2 illustrates the system for ECU identification of FIG. 1 in alternative detail.

FIG. 2 illustrates system 100 of FIG. 1 in alternate detail. As depicted, system 100 includes ECUs 110 and observation circuitry 124. Further, as described above, observation circuitry 124 is arranged to measure voltage on communication bus 130 at two points, particularly, points 132-1 and 132-2. This figure depicts observation circuitry (A) 124-1 and observation circuitry (B) 124-2. In particular, observation circuitry (A) 124-1 is coupled to communication bus 130 and points 132-1 while observation circuitry (B) 124-2 is coupled to communication bus 130 and points 132-2. It is noted, that points 132-1 and 132-2 and the associated connection to observation circuitry 124-1 and 124-2 is depicted at extreme ends of communication bus 130 for purposes of explanation. However, points 132-1 and 132-2 can be anywhere on communication bus 130.

As depicted in this figure, the observed voltage at points 132 of signals send by ECU 110-1 will be impacted by the lengths 210 and 220, respectively. With some examples, system 100, and points 132, can be arranged such that for each ECU 110 to be fingerprinted there is a difference between lengths 210 and 220. That is, for each ECU 110 no lengths 210 and 220 are the same. However, this is not a requirement, and in some examples, lengths 210 and 220 can be the same for some ECUs 110.

Figure 3:
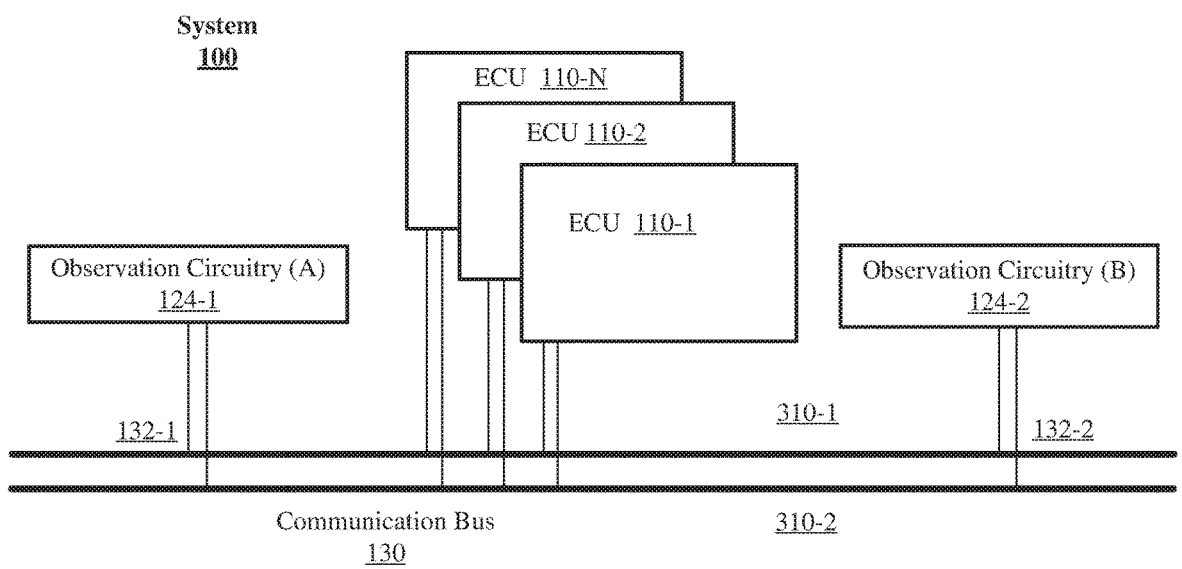
FIG. 3 illustrates the system for ECU identification of FIG. 2 in alternative detail.

FIG. 3 illustrates system 100 of FIG. 1 in alternate detail. As depicted, system 100 includes ECUs 110 and observation circuitry 124. Further, as described above, in some examples, communication bus 130 can comprise a pair of conductors. As such, this figure depicts communication bus 130 comprising conductors 310-1 and 310-2. During operation, ECUs 110 can communicate signals via conductors 310 and observation circuitry 124 can observe voltage transitions from conductors 310-1 and 310-2.

Figure 4:
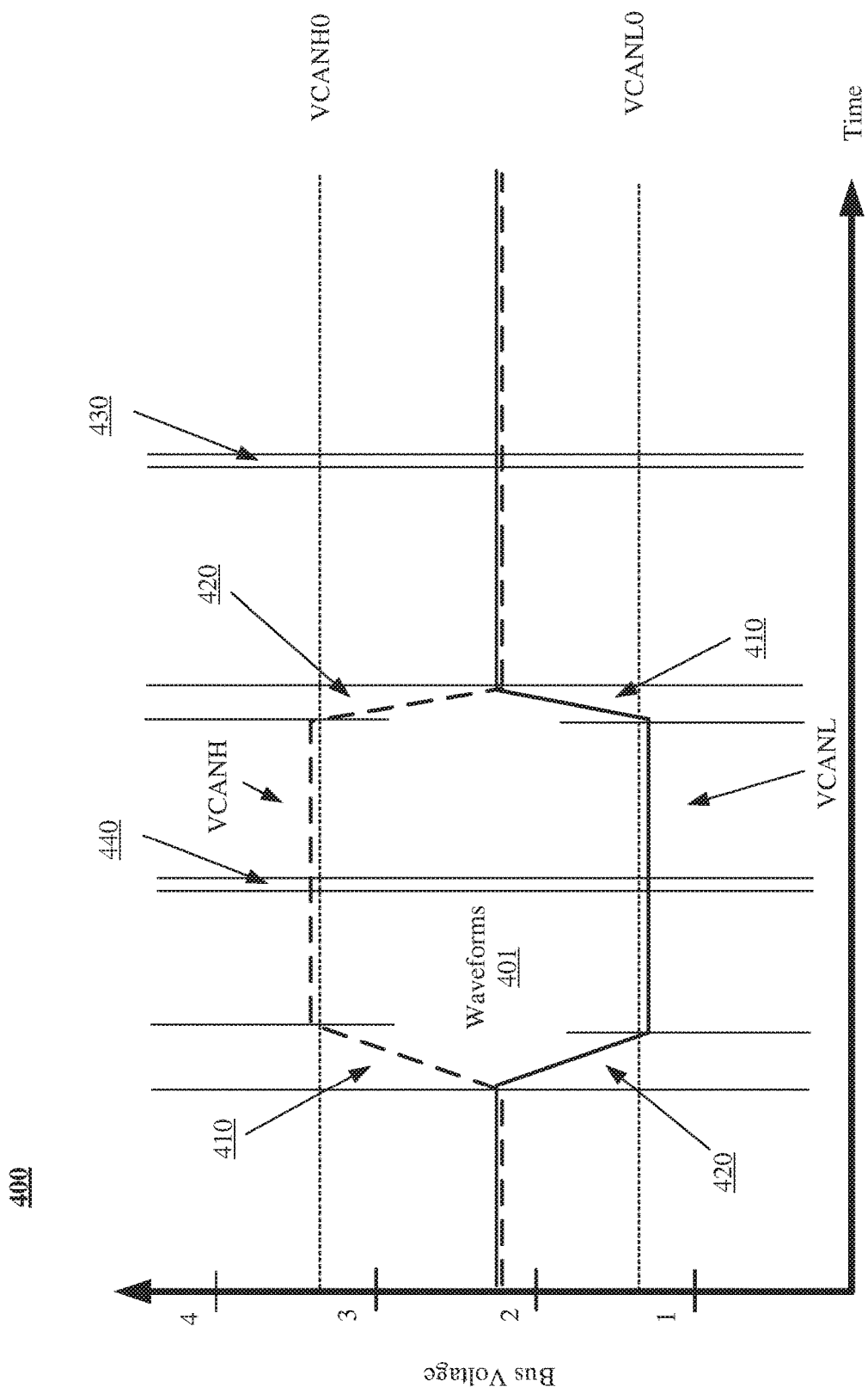
FIG. 4 illustrates a graph of voltage waveforms on a communication bus.

As noted, the present disclosure provides ECU identification based on voltage transitions. Accordingly, FIG. 4 illustrates a graph 400, showing example waveforms 401 undergoing voltage transitions. Furthermore, as the present disclosure can be implemented for IVNs (e.g., the CAN bus, or the like) the waveforms 401 are described with reference to the CAN bus. However, examples are not limited in this regard. This figure depicts nominal recessive and dominant bus voltages for a CAN bus. The CAN bus is comprised of two conductors, as such two waveforms 401 are depicted.

When an ECU (e.g., ECU 110, or the like) sends a 0 bit, it does so by increasing a first voltage (VCANH coupled to CANH) to at least VCANH0 and decreasing a second voltage (VCANL coupled to CANL) to at least VCANL0. For example, VCANH0 may be about 3.5 volts (V), while the VCANL0 may be about 1.5V. It is noted, that the term "about" may mean within a threshold value (e.g., 1%, or the like) and can be dependent upon the bus standard, which may dictate the tolerance. In the recessive state, either the CAN bus (e.g., communication bus 130) is idle or an ECU is transmitting a logic 1. In the dominant state, at least one ECU is transmitting a logic 0. Thus, each waveform on the CAN bus can go through a number of voltage transitions.

These voltage transitions are measured as a voltage over time and correspond to a portion of the overall voltage waveform. In particular, waveforms 401 can have a rising edge transition 410 or a falling edge transition 420. Additionally, waveforms 401 can have a steady state transitions 430 and 440. That is, waveforms 401 can have a steady state transition 430 for both the recessive state as well as a steady state transition 440 for the dominant state. To send a message (e.g., messages 180, or the like) on the CAN bus, an ECU must cause a number of voltage transitions (e.g., 410, 420, 430, and/or 440) on the CAN bus to communicate bits indicating the message 180.

As noted, in some examples, voltage on multiple conductors (e.g., conductors 310-1 and 310-2) can be observed whereas in other examples, a single conductor can be sampled to observe voltage transitions. Thus, observed waveforms 140 can be have a pair of transitions for each observation point 132-1 and 132-2 or a single transition at each observation point 132-1 and 132-2. Examples are not limited in this context.

Figure 5:
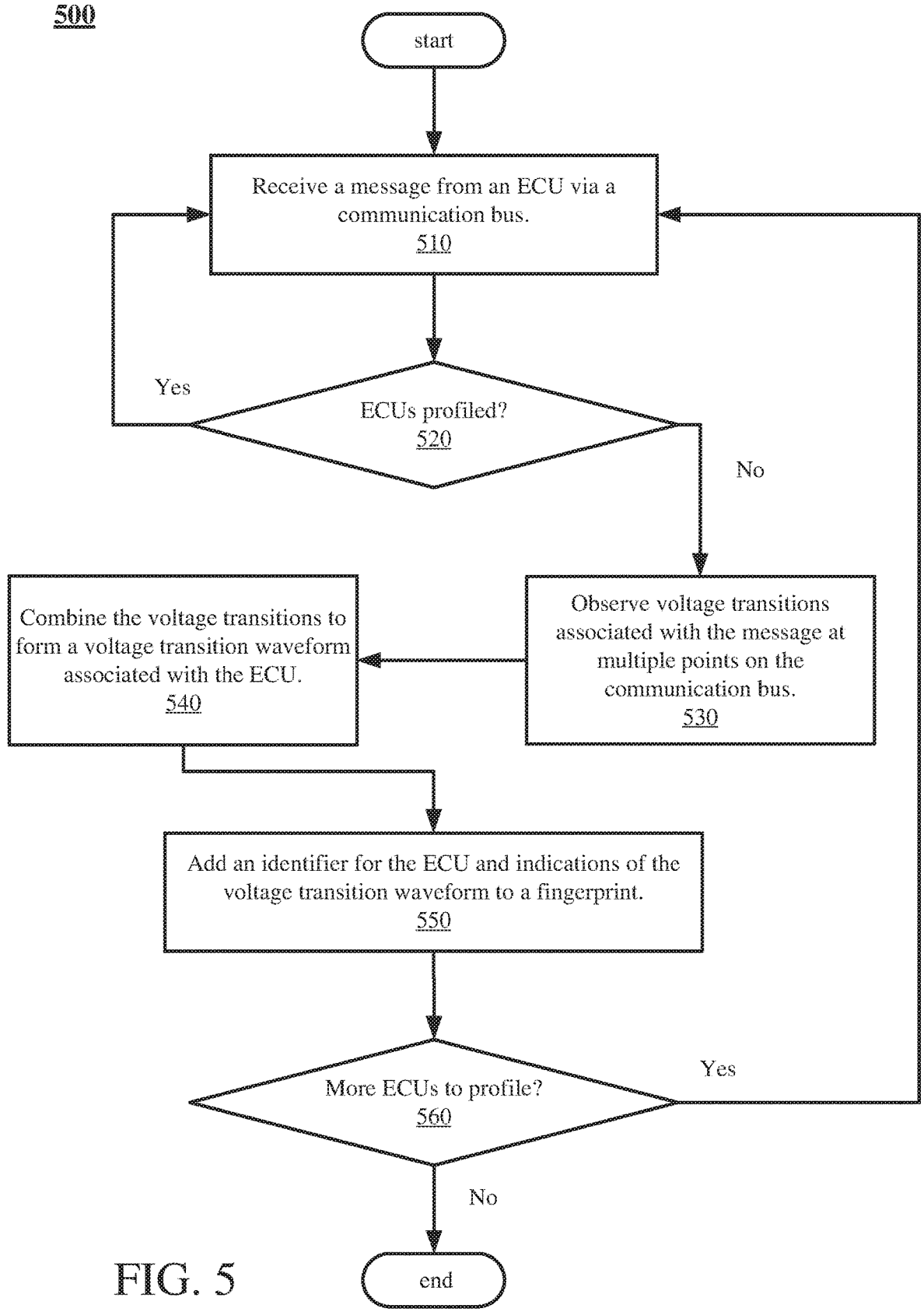
FIG. 5 illustrates a logic flow to profile ECU waveforms.

FIG. 5 depicts a logic flow 500. Logic flow 500 can be implemented by an intrusion detection system (IDS), such as ECU identification component 120, to profile ECUs (or generate fingerprints for ECUs). The logic flows described herein, including logic flow 500 and other logic flows described herein, are representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Logic flow 500 may begin at block 510. At block 510 "receive a message from an ECU via a communication bus" processing circuitry can receive a message from an ECU. For example, processing circuitry 122 of ECU identification component 120 can receive a message 180 from an ECU 110 via communication bus 130. Particularly, processing circuitry 122 in executing instructions 128 can read a message 180 (e.g., message 180-1, 180-2, etc.) sent by an ECU 110 (e.g., ECU 110-1, 110-2, etc.) from communication bus 130.

Continuing to decision block 520 "ECU profiled?" processing circuitry can determine whether to the ECU associated with the message read at block 510 has been profiled. For example, processing circuitry 122, in executing instructions 128, can determine whether the ECU 110 associated with the message 180 read at block 510 has been profiled, or said differently, has been fingerprinted. From decision block 520, logic flow 500 can return to block 510 or can continue to block 530. In particular, logic flow 500 can return to block 510 based on a determination at block 520 that the ECU has been profiled while logic flow 500 can continue to block 530 based on a determination at block 520 that the ECU has not been profiled.

At block 530 "observe voltage transitions associated with the message at multiple points on the communication bus" processing circuitry can observe voltage transitions associated with the message at multiple points on the communication bus. For example, observation circuitry 124 of ECU identification component 120 can observe the communication bus 130 and particularly the voltage transitions on the communication bus 130 resulting from the ECU 110 transmitting the message 180. More specifically, observation circuitry 124-1 can observe voltage transitions at point 132-1 of communication bus 130 while observation circuitry 124-2 can observe voltage transitions at points 132-2 of communication bus 130.

Continuing to block 540 "combine the voltage transitions to form voltage waveform(s) associated with the ECU" processing circuitry can combine the observed voltage transitions to form a number of 2D waveforms associated with the ECU. More specifically, processing circuitry 122 in executing instructions 128 can combine the voltage transition observed from a first point on communication bus 130 (e.g., point 132-1) with the voltage transitions observed at a second point on communication bus 130 (e.g., point 132-2). In some examples, a 2D waveform can be generated by plotting the voltage transitions from one point on the X axis and the voltage transitions from the other point on the Y axis. Processing circuitry 122 in executing instructions 182 can store the generated 2D waveform as waveforms 152.

It is noted, that waveforms for various transitions (E.g., steady state, rising, falling, etc.) can be generated. Examples of this are given in FIGS. 7A-7J, described below.

Continuing to block 550 "add an identifier for the selected ECU and indications of the observed waveforms of the voltage transitions to a fingerprint" processing circuitry can add indications of the generated waveforms of the voltage transitions and an identifier for the ECU to a fingerprint. For example, processing circuitry 122 of ECU identification component 120 can add waveform 152 and ECU ID 154 to fingerprint 150. Particularly, processing circuitry 122 in executing instructions 128 can add indications of waveforms 152 (e.g., corresponding to waveforms generated based on the observed voltage transitions) and an ECU ID 154 (e.g., an identifier for the selected ECU 110) to the fingerprint 150. It is noted, fingerprint 150 can have a number of entries for ECU IDs 154, and thus a number of entries for waveform 152. Furthermore, for each ECU ID 154, multiple waveforms may be indicated (e.g., rising edge waveform, falling edge waveform, steady state waveform, or the like).

Continuing to decision block 560 "more ECUs to profile?" processing circuitry can determine whether to there are more ECUs to profile. For example, processing circuitry 122 can determine whether there are more ECUs 110 to profile. With some examples, fingerprint 150 can be pre-populated with ECU IDs 154 (e.g., by a manufacturer, by a platform installer, by a technician, or the like). Thus, processing circuitry 122 in executing instructions 128 can determine whether any ECU IDs 154 in fingerprint 150 are left to profile. From decision block 560, logic flow 500 can return to block 510 or can end. In particular, logic flow 500 can return to block 510 based on a determination at block 560 that there are more ECUs to profile while logic flow 500 can end based on a determination at block 560 that there are not any more ECUs to profile.

Figure 6:
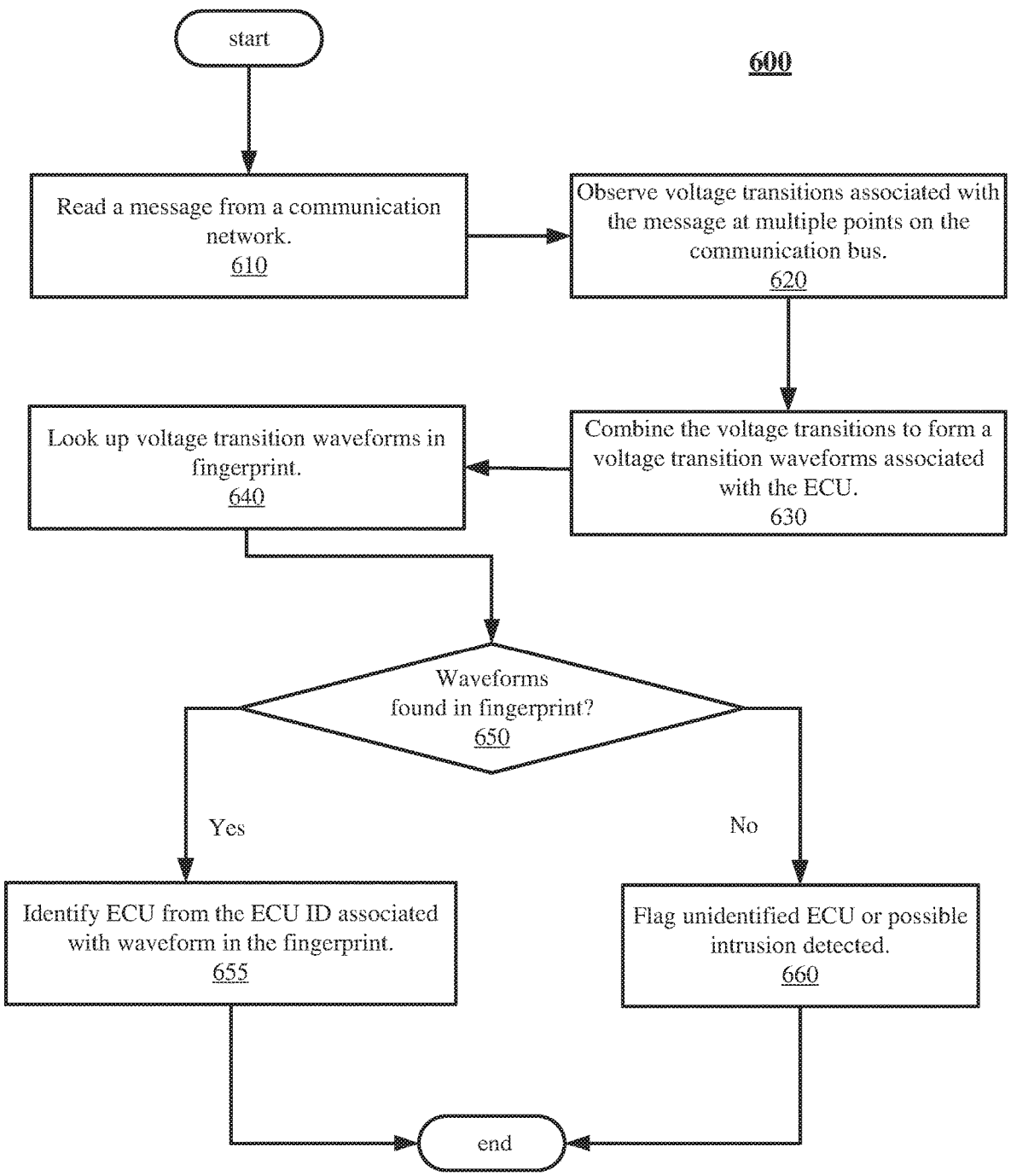
FIG. 6 illustrates a logic flow to identify ECUs from waveforms.
Figure 7A:
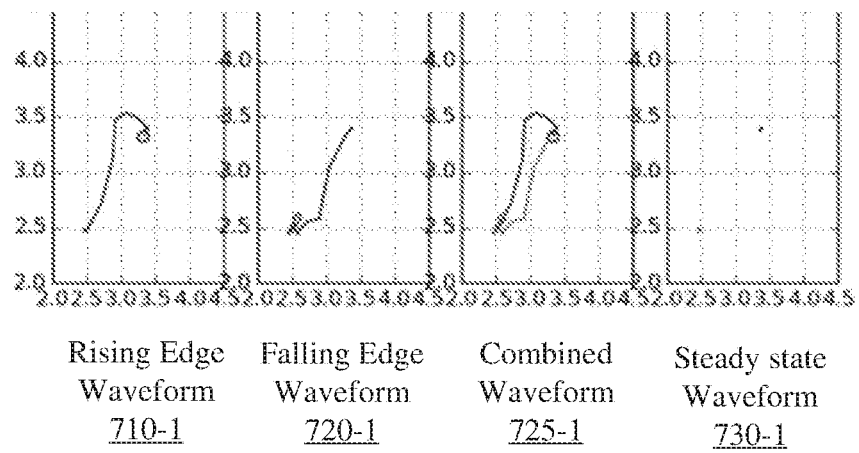
FIGS. 7A to 7J illustrate examples of voltage transition waveforms from a number of ECUs.
Figure 7B:
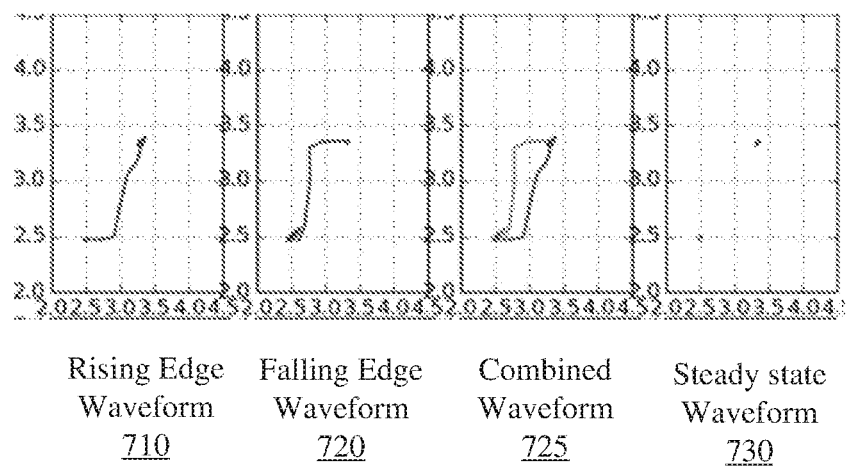
Figure 7C:
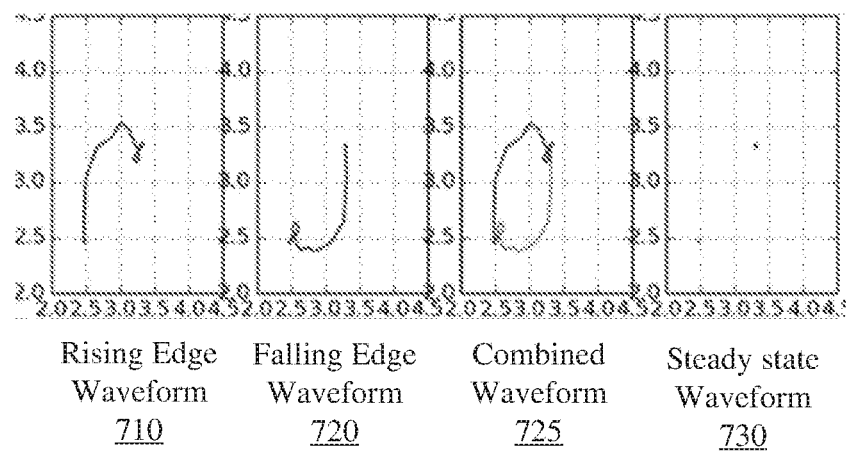
Figure 7D:
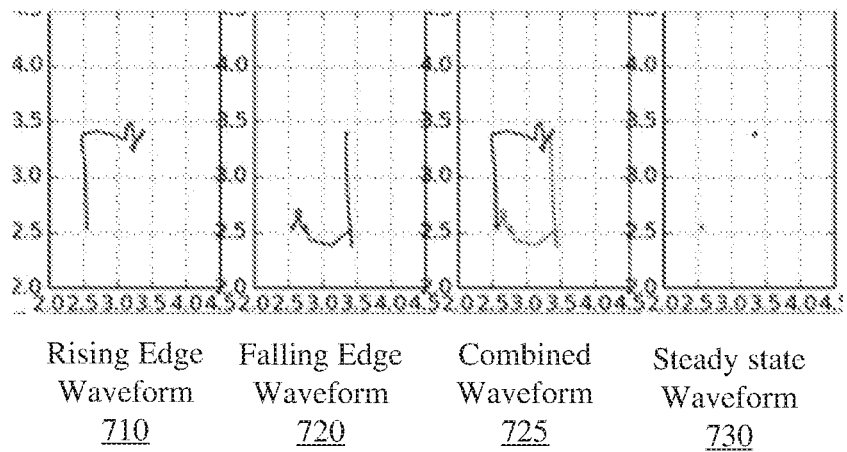
Figure 7E:
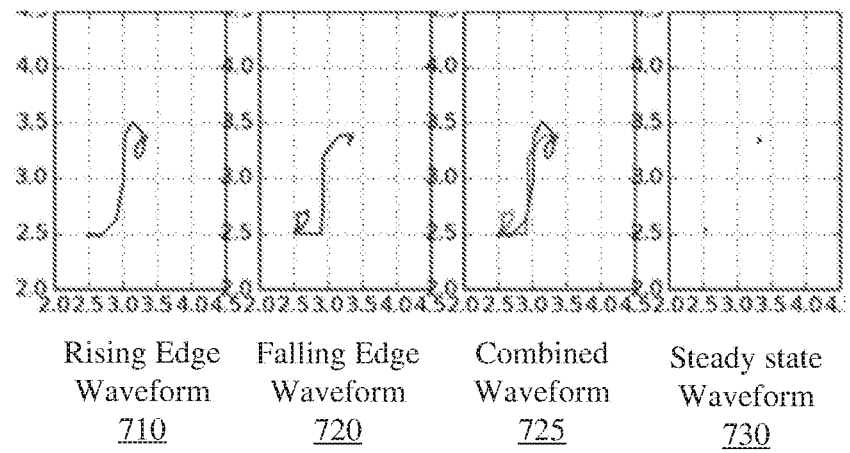
Figure 7F:
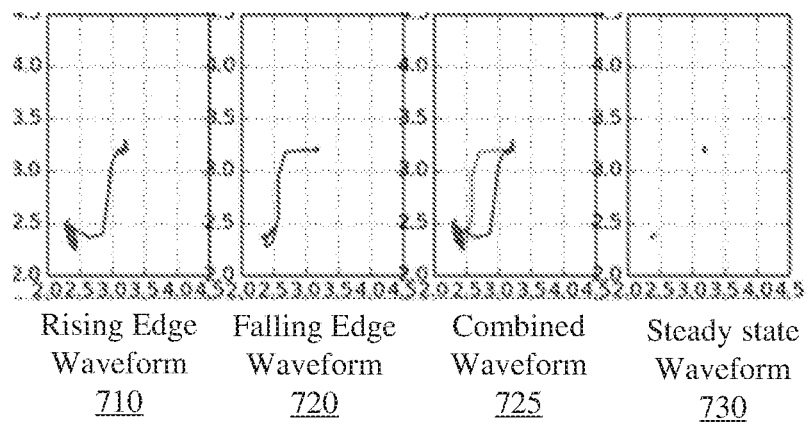
Figure 7G:
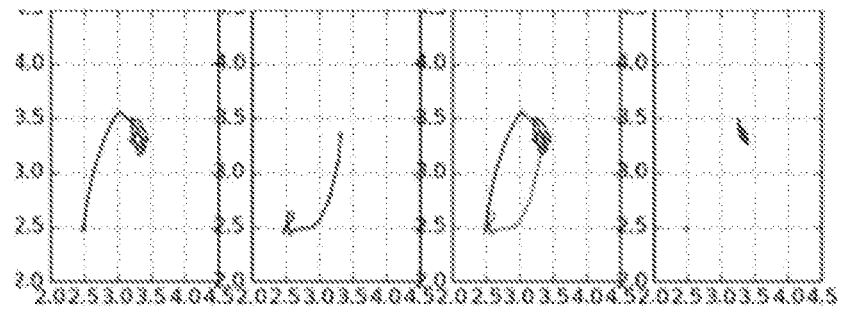
Figure 7H:
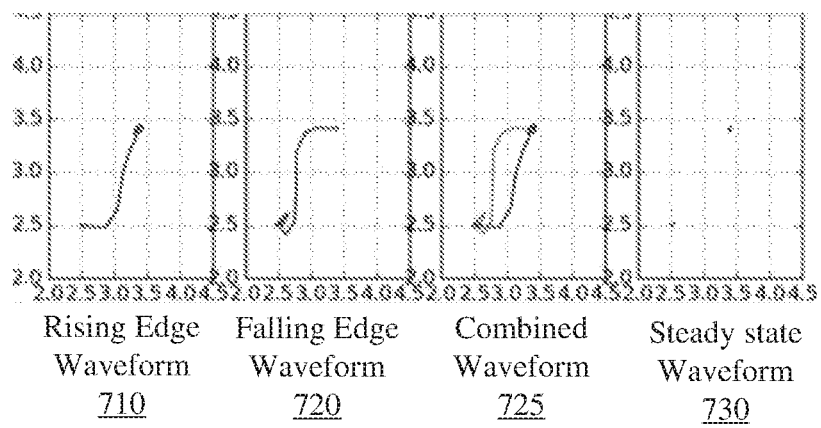
Figure 7I:
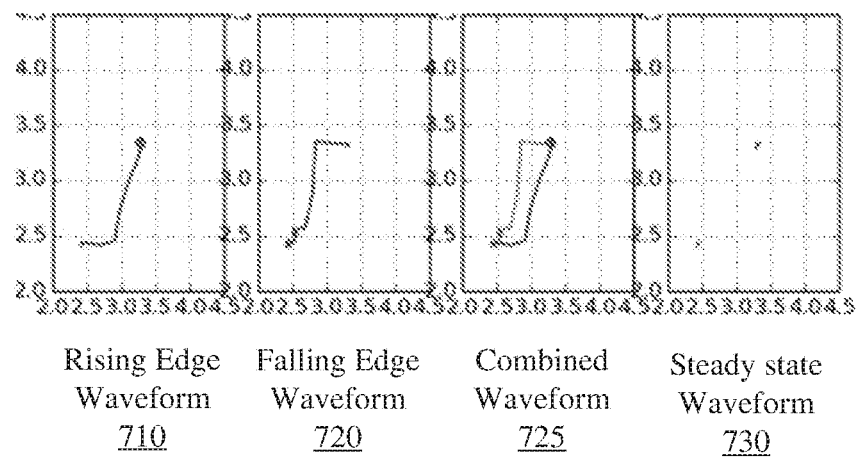
Figure 7J:
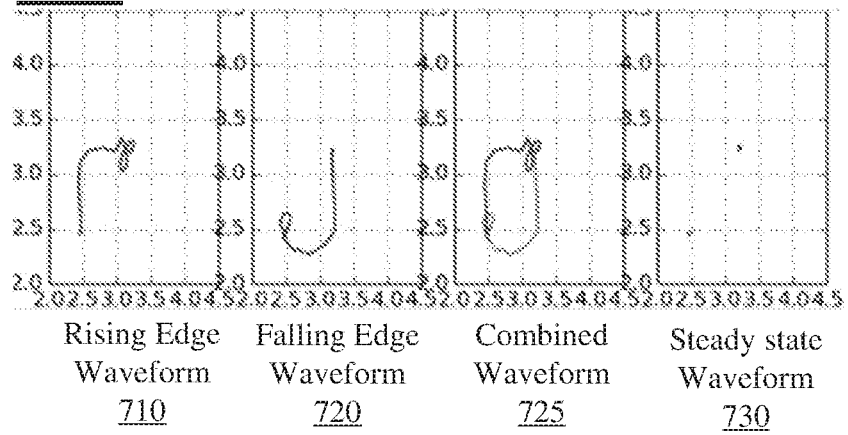

FIG. 6 depicts a logic flow 600. Logic flow 600 can be implemented by an intrusion detection system (IDS), such as ECU identification component 120, to identify ECUs. Logic flow 600 may begin at block 610. At block 610 "read a message from a communication network" processing circuitry can read a message from a communication network. For example, processing circuitry 122 of ECU identification component 120 can read a message from communication network. Particularly, processing circuitry 122 in executing instructions 128 can read a message 180 transmitted by an ECU onto communication bus 130.

Continuing to block 620 "observe voltage transitions associated with the message at multiple points on the communication bus" processing circuitry can observe voltage transitions associated with the message at multiple points on the communication bus. For example, observation circuitry 124 of ECU identification component 120 can observe the communication bus 130 and particularly the voltage transitions on the communication bus 130 resulting from the ECU 110 transmitting the message 180 read at block 610. More specifically, observation circuitry 124-1 can observe voltage transitions at point 132-1 of communication bus 130 while observation circuitry 124-2 can observe voltage transitions at points 132-2 of communication bus 130.

Continuing to block 630 "combine the voltage transitions to form voltage waveform(s) associated with the ECU" processing circuitry can combine the observed voltage transitions to form a number of 2D waveforms associated with the ECU. More specifically, processing circuitry 122 in executing instructions 128 can combine the voltage transition observed from a first point on communication bus 130 (e.g., point 132-1) with the voltage transitions observed at a second point on communication bus 130 (e.g., point 132-2). In some examples, a 2D waveform can be generated by plotting the voltage transitions from one point on the X axis and the voltage transitions from the other point on the Y axis.

Continuing to block 640 "look up waveforms in fingerprint" processing circuitry can look up the generated voltage transitions waveforms in the fingerprint. For example, processing circuitry 122 of ECU identification component 120 can look up the generated waveforms in a fingerprint. Particularly, processing circuitry 122 in executing instructions 128 can look up waveforms generated at block 630 in fingerprint 150. As a specific example, processing circuitry 122 in executing instructions 128 can look up (e.g., compare, match, or the like) waveforms generated at block 630 with waveforms 152 from fingerprint 150. In some examples, processing circuitry 122 can execute a machine learning model (e.g., pattern classification model, etc.) to lookup (or match) the generated waveforms in fingerprint 150

Continuing to decision block 650 "waveforms found in fingerprint?" processing circuitry can determine whether the waveforms are found in the fingerprint. For example, processing circuitry 122 can determine whether the waveforms are found in the fingerprint. Particularly, processing circuitry 122 in executing instructions 128 can determine whether the waveforms generated at block 630 are found in fingerprint 150 (e.g., based on looking up the waveform at block 640, or the like). From decision block 650, logic flow 600 can continue to either block 655 or block 660. In particular, logic flow 600 can continue from decision block 650 to block 655 based on a determination at decision block 650 that the waveform was found in the fingerprint while logic flow 600 can continue from decision block 650 to block 450 660 based on a determination at decision block 650 that the waveform was not found in the fingerprint.

At block 655 "identify ECU from ECU ID associated with the waveform in the fingerprint" processing circuitry can identify the ECU transmitting the message read at block 610 based on the EDU ID associated with the waveform in the fingerprint. For example, processing circuitry 122 of ECU identification component 120 can identify the ECU that transmitted the message read at block 610 based on the ECU ID associated with the waveform in the fingerprint that matches the observed waveform. Particularly, processing circuitry 122 in executing instructions 128 can identify the ECU 110 that transmitted the message 180 read at block 610 from the ECU ID 154 associated with the waveform 152 in the fingerprint 150 that matches the waveform generated, at block 630, from voltage transitions observed at block 620.

At block 660 "flag unidentified ECU or possible intrusion detected" processing circuitry can flag an unidentified ECU or a potential intrusion. For example, processing circuitry 122 of ECU identification component 120 can flag (e.g., send a notification to a user, send a notification to a cloud monitoring service, send a notification to a management ECU, or the like) an unidentified ECU or a possible intrusion into the network. Particularly, processing circuitry 122 in executing instructions 128 can flag an unidentified ECU 110.

FIGS. 7A to 7J illustrate examples of waveforms 752 for a number of ECUs. In particular, each of these figures illustrates a rising edge waveform 710, a falling edge waveform 720, a combined waveform 725 (e.g., combined rising and falling edge), and a steady state waveform 730. Furthermore, each of these figures corresponds to a different ECU. Specifically, waveforms 752-1, 752-2, 752-3, 752-4, 752-5, 752-6, 752-7, 752-8, 752-9, and 752-10 are depicted for 10 individual ECUs. These waveforms were measured from actual ECUs in a system. As can be seen, these ECUs each have waveforms 752 that are distinct from the others, and thus can be used as fingerprints in an IDS. Furthermore, as depicted, each of the waveforms is a 2D plot with voltage on the X and Y axis. These waveforms can be generated, as describe herein, by plotting an observed voltage transition from a first point (e.g., point 132-1, or the like) on the X axis and an observed voltage transition from a second point (e.g., point 132-2, or the like) on the Y axis.

Figure 8:
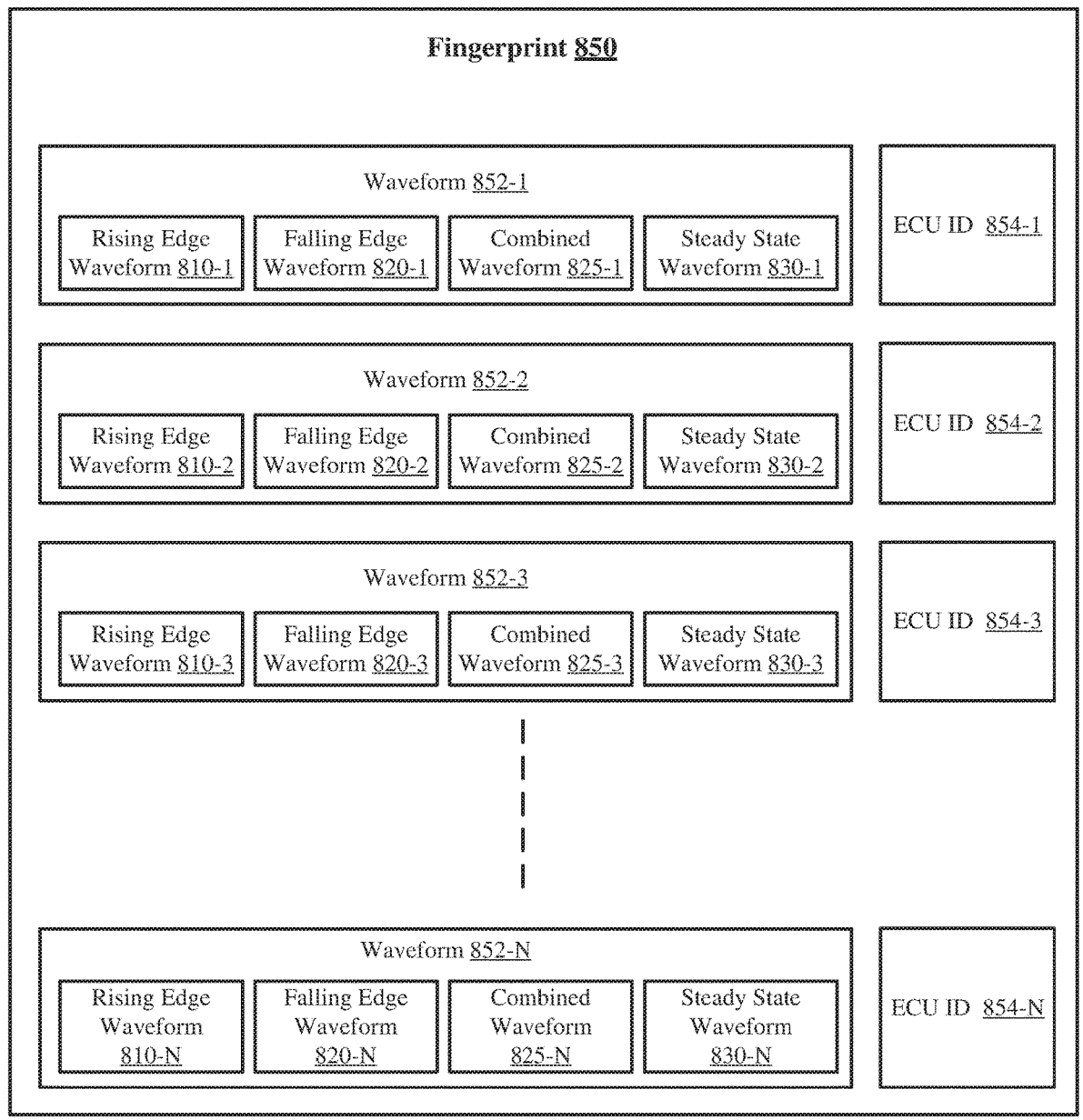
FIG. 8 illustrates an example fingerprint for an ECU identification system.

FIG. 8 illustrates an example fingerprint 850 including profiles for multiple ECUs. Fingerprint 850 can be an example of fingerprint 150 from system 100 of FIG. 1. In general, fingerprint 850 includes an entry for each ECU in the system, where each entry includes an ECU ID 854 and an associated waveform 852. In particular, this figure illustrates ECU IDs 854-1, 854-2, 854-3 through 854-N, where N is a positive integer. Each ECU ID 854 includes an associated waveform 852. As such, waveforms 852-1, 852-2, 852-3 through 852-N are shown. In this figure, each waveform includes indications of a rising edge waveform 810, a falling edge waveform 820, a combined waveform 825, and a steady state waveform 830. Particularly, waveform 852-1 depicts rising edge waveform 810-1, falling edge waveform 820-1, combined waveform 825-1, and steady state waveform 830-1; waveform 852-2 depicts rising edge waveform 810-2, falling edge waveform 820-2, combined waveform 825-2, and steady state waveform 830-2; waveform 852-3 depicts rising edge waveform 810-3, falling edge waveform 820-3, combined waveform 825-3, and steady state waveform 830-3; waveform 852-4 depicts rising edge waveform 810-4, falling edge waveform 820-4, combined waveform 825-4, and steady state waveform 830-4; and waveform 852-5 depicts rising edge waveform 810-5, falling edge waveform 820-5, combined waveform 825-5, and steady state waveform 830-5. Fingerprint 850 can be implemented in a database, in a table, or in another information element or data structure.

Figure 9:
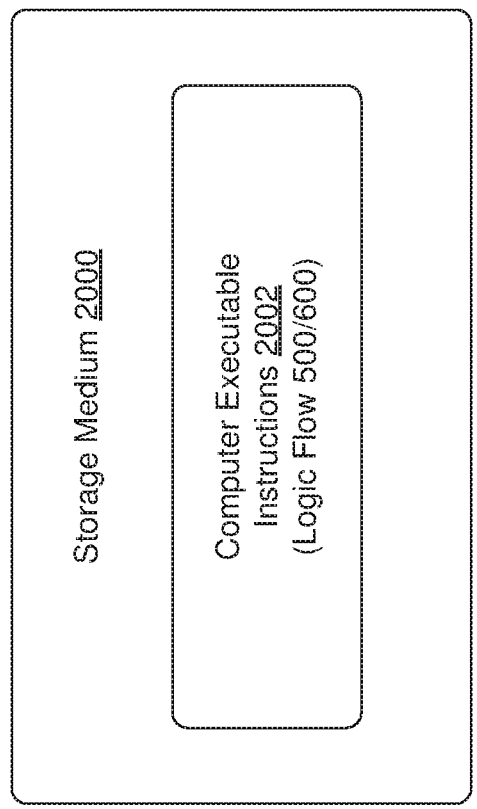
FIG. 9 illustrates an example non-transitory storage medium.

FIG. 9 illustrates an example of a storage medium 2000. Storage medium 2000 may comprise an article of manufacture. In some examples, storage medium 2000 may include any non-transitory computer readable medium or machine readable medium, such as an optical, magnetic or semiconductor storage. Storage medium 2000 may store various types of computer executable instructions 2002, such as instructions to implement logic flow 500 or logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
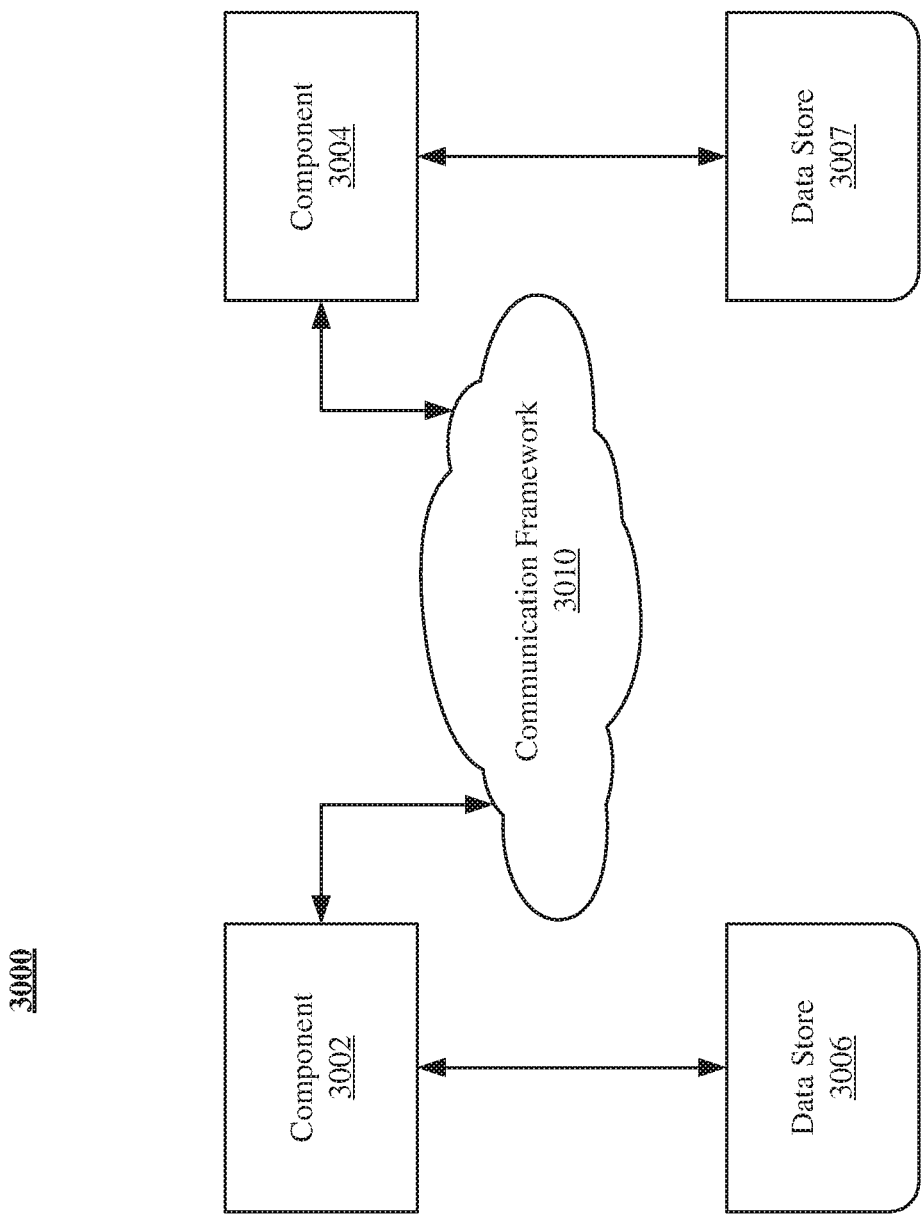
FIG. 10 illustrates an example in-vehicle communication architecture.

FIG. 10 illustrates an exemplary in-vehicle communications architecture 3000 according to one or more embodiments of the disclosure. For example, one or more vehicular components, such as component 3002 and 3004, may communicate with each other via a communications framework 3010, which may be an in-vehicle network, such as a CAN bus, implemented to facilitate fingerprinting of ECUs as described above.

The communications architecture 3000 includes various common communications elements, such as a transmitter, receiver, transceiver, and so forth. The embodiments, however, are not limited to implementation by the communications architecture 3000. As shown in this figure, the vehicular components 3002 and 3004 may each be operatively connected to one or more respective client data stores 3006 and 3007 that can be employed to store information local to the respective components 3002 and 3004, such as cookies and/or associated contextual information. It may be understood that the components 3002 and 3004 may be any suitable vehicular component, such as sensor, an ECU, microcontroller, microprocessor, processor, ASIC, field programmable gate array (FPGA), any electronic device, computing device, or the like. Moreover, it may be understood that one or more computing devices (containing at least a processor, memory, interfaces, etc.) may be connected to the communication framework 3010 in a vehicle.

Further, the communications framework 3010 may implement any well-known communications techniques and protocols. As described above, the communications framework 3010 may be implemented as a CAN bus protocol or any other suitable in-vehicle communication protocol.

The communications framework 3010 may also implement various network interfaces arranged to accept, communicate, and connect to one or more external communications networks (e.g., Internet). A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. The communication framework 3010 may employ both wired and wireless connections.

The components and features of the devices described above may be implemented using any combination of: processing circuitry, discrete circuitry, application specific integrated circuits (ASICs), logic gates and/or single chip architectures, etc. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The following examples pertain to further embodiments, from which numerous permutations and configurations will be apparent.

Example 1

An apparatus, comprising: processing circuitry; memory coupled to the processing circuitry, the memory comprising instructions that when executed by the processing circuitry cause the processing circuitry to: receive an waveform associated with a message read from a communication bus, determine whether the waveform matches a fingerprint waveform from a fingerprint, and identify an electronic control unit (ECU) associated with the fingerprint waveform based on a determination that the waveform matches the fingerprint waveform.

Example 2

The apparatus of claim 1, the instructions when executed by the processing circuitry cause the processing circuitry to: compare the waveform to a plurality of fingerprint waveforms from the fingerprint, the plurality of fingerprint waveforms comprising the fingerprint waveform; and determine whether the waveform matches the fingerprint waveforms based on comparing the waveform to the plurality of fingerprint waveforms.

Example 3

The apparatus of claim 1, the waveform comprising a rising edge waveform, a falling edge waveform, or a steady state waveform.

Example 4

The apparatus of claim 1, the instructions when executed by the processing circuitry cause the processing circuitry to read the message from the communication bus, the waveform generated based on reading the message.

Example 5

The apparatus of claim 4, comprising observation circuitry, the observation circuitry arranged to observe voltage at a first point on the communication bus and at a second point on the communication bus.

Example 6

The apparatus of claim 5, the instructions when executed by the processing circuitry cause the processing circuitry to: identify a voltage transition from the voltage observed at the first point; identify a voltage transition from the voltage observed at the second point; combine the identified voltage transition from the voltage observed at the first point with the identified voltage transition from the voltage observed at the second point to form the waveform.

Example 7

The apparatus of claim 1, the instructions when executed by the processing circuitry cause the processing circuitry to: look up an ECU identification (ID) associated with the fingerprint waveform; and identify the ECU based on the ECU ID.

Example 8

The apparatus of claim 7, the memory comprising the fingerprint, the fingerprint comprising a plurality of fingerprint waveforms and an ECU ID for each of the plurality of fingerprint waveforms.

Example 9

The apparatus of claim 1, the instructions when executed by the processing circuitry cause the processing circuitry to flag an unidentified ECU based on a determination that the observed waveform does not match the fingerprint waveform.

Example 10

A system, comprising: at least one electronic control unit (ECU); and ECU identification sub-system coupled to the at least one ECU via an in-vehicle network (IVN), the ECU identification sub-system comprising: processing circuitry; memory coupled to the processing circuitry, the memory comprising instructions that when executed by the processing circuitry cause the processing circuitry to: read a message from the IVN, observe voltage transitions on the IVN associated with the message, generate a waveform associated with the message based in part on the observed voltage transitions, determine whether the waveform matches a fingerprint waveform from a fingerprint, the fingerprint waveform associated with a one of the at least one ECU, and identify the ECU of the at least one ECU as sending the message via the IVN based on a determination that the waveform matches the fingerprint waveform.

Example 11

The system of claim 10, the instructions when executed by the processing circuitry cause the processing circuitry to: compare the waveform to a plurality of fingerprint waveforms from the fingerprint, the plurality of fingerprint waveforms comprising the fingerprint waveform; and determine whether the waveform matches the fingerprint waveforms based on comparing the waveform to the plurality of fingerprint waveforms.

Example 12

The system of claim 10, the waveform comprising a rising edge waveform, a falling edge waveform, or a steady state waveform.

Example 13

The system of claim 10, the ECU identification sub-system comprising observation circuitry, the observation circuitry arranged to observe a first voltage transition at a first point on the communication bus and a second voltage transition at a second point on the communication bus.

Example 14

The apparatus of claim 13, the instructions when executed by the processing circuitry cause the processing circuitry to combine the first voltage transition with the second voltage transition to generate the waveform.

Example 15

The system of claim 10, the instructions when executed by the processing circuitry cause the processing circuitry to: look up an ECU identification (ID) associated with the fingerprint waveform; and identify the ECU of the at least one ECU based on the ECU ID.

Example 16

The system of claim 10, the instructions when executed by the processing circuitry cause the processing circuitry to flag an unidentified ECU on the IVN based on a determination that the observed waveform does not match the fingerprint waveform.

Example 17

A method, comprising: reading a message from an in-vehicle network; observing, via observation circuitry, voltage transitions associated with the message; generating a waveform based in part on the observed voltage transitions; determining whether the waveform matches a fingerprint waveform from a fingerprint; and identifying an electronic control unit (ECU) associated with the fingerprint waveform based on a determination that the waveform matches the fingerprint waveform.

Example 18

The method of claim 17, comprising: comparing the waveform to a plurality of fingerprint waveforms from the fingerprint, the plurality of fingerprint waveforms comprising the fingerprint waveform; and determining whether the waveform matches the fingerprint waveforms based on comparing the waveform to the plurality of fingerprint waveforms.

Example 19

The method of claim 17, the waveform comprising a rising edge waveform, a falling edge waveform, or a steady state waveform.

Example 20

The method of claim 17, comprising: observing, via observation circuitry, voltage at a first point on the communication bus; and observing, via observation circuitry, voltage at a second point on the communication bus.

Example 21

The method of claim 20, comprising: identify a first voltage transition from the voltage observed at the first point; identify a second voltage transition from the voltage observed at the second point; and combine the first voltage transition with the second voltage transition to form the waveform.

Example 22

The method of claim 17, comprising: looking up an ECU identification (ID) associated with the fingerprint waveform; and identifying the ECU based on the ECU ID.

Example 23

The method of claim 22, the fingerprint comprising a plurality of fingerprint waveforms and an ECU ID for each of the plurality of fingerprint waveforms.

Example 24

The method of claim 17, comprising flagging an unidentified ECU based on a determination that the observed waveform does not match the fingerprint waveform.

Example 25

An apparatus, comprising means arranged to implement the function of any one of claims 17 to 24.

Example 26

At least one non-transitory computer-readable storage medium comprising instructions that when executed by processing circuitry cause the processing circuitry to: read a message from an in-vehicle network; observe, via observation circuitry, voltage transitions associated with the message; generate a waveform based in part on the observed voltage transitions; determine whether the waveform matches a fingerprint waveform from a fingerprint; and identify an electronic control unit (ECU) associated with the fingerprint waveform based on a determination that the waveform matches the fingerprint waveform.

Example 27

The non-transitory computer-readable storage medium of claim 26, comprising instructions that when executed by the processing circuitry cause the processing circuitry to: compare the waveform to a plurality of fingerprint waveforms from the fingerprint, the plurality of fingerprint waveforms comprising the fingerprint waveform; and determine whether the waveform matches the fingerprint waveforms based on comparing the waveform to the plurality of fingerprint waveforms.

Example 28

The non-transitory computer-readable storage medium of claim 26, the waveform comprising a rising edge waveform, a falling edge waveform, or a steady state waveform.

Example 29

The non-transitory computer-readable storage medium of claim 26, comprising instructions that when executed by the processing circuitry cause the processing circuitry to: observe, via observation circuitry, voltage at a first point on the communication bus; and observe, via observation circuitry, voltage at a second point on the communication bus.

Example 30

The non-transitory computer-readable storage medium of claim 29, comprising instructions that when executed by the processing circuitry cause the processing circuitry to: identify a first voltage transition from the voltage observed at the first point; identify a second voltage transition from the voltage observed at the second point; and combine the first voltage transition with the second voltage transition to form the waveform.

Example 31

The non-transitory computer-readable storage medium of claim 26, comprising instructions that when executed by the processing circuitry cause the processing circuitry to: look up an ECU identification (ID) associated with the fingerprint waveform; and identify the ECU based on the ECU ID.

Example 32

The non-transitory computer-readable storage medium of claim 31, the fingerprint comprising a plurality of fingerprint waveforms and an ECU ID for each of the plurality of fingerprint waveforms.

Example 33

The non-transitory computer-readable storage medium of claim 26, comprising instructions that when executed by the processing circuitry cause the processing circuitry to flag an unidentified ECU based on a determination that the observed waveform does not match the fingerprint waveform.

What is claimed is:

1. An apparatus, comprising:
   processing circuitry;
   memory coupled to the processing circuitry, the memory comprising instructions that when executed by the processing circuitry cause the processing circuitry to:
      receive a waveform associated with a message read from multiple points on a communication bus,
      determine whether the waveform matches a fingerprint waveform from a fingerprint, and
      identify an electronic control unit (ECU) associated with the fingerprint waveform based on a determination that the waveform matches the fingerprint waveform.

2. The apparatus of claim 1, the instructions when executed by the processing circuitry cause the processing circuitry to:
   compare the waveform to a plurality of fingerprint waveforms from the fingerprint, the plurality of fingerprint waveforms comprising the fingerprint waveform; and
   determine whether the waveform matches the fingerprint waveforms based on comparing the waveform to the plurality of fingerprint waveforms.

3. The apparatus of claim 1, the waveform comprising a rising edge waveform, a falling edge waveform, or a steady state waveform.

4. The apparatus of claim 1, the instructions when executed by the processing circuitry cause the processing circuitry to read the message from the communication bus, the waveform generated based on reading the message.

5. The apparatus of claim 4, comprising observation circuitry, the observation circuitry arranged to observe voltage at a first point on the communication bus and at a second point on the communication bus.

6. The apparatus of claim 5, the instructions when executed by the processing circuitry cause the processing circuitry to:
   identify a voltage transition from the voltage observed at the first point;
   identify a voltage transition from the voltage observed at the second point;
   combine the identified voltage transition from the voltage observed at the first point with the identified voltage transition from the voltage observed at the second point to form the waveform.

7. The apparatus of claim 1, the instructions when executed by the processing circuitry cause the processing circuitry to:
   look up an ECU identification (ID) associated with the fingerprint waveform; and
   identify the ECU based on the ECU ID.

8. The apparatus of claim 7, the memory comprising the fingerprint, the fingerprint comprising a plurality of fingerprint waveforms and an ECU ID for each of the plurality of fingerprint waveforms.

9. The apparatus of claim 1, the instructions when executed by the processing circuitry cause the processing circuitry to flag an unidentified ECU based on a determination that the observed waveform does not match the fingerprint waveform.

10. A system, comprising:
    at least one electronic control unit (ECU); and
    ECU identification sub-system coupled to the at least one ECU via a communication bus of an in-vehicle network (IVN), the ECU identification sub-system comprising:
      processing circuitry;
      memory coupled to the processing circuitry, the memory comprising instructions that when executed by the processing circuitry cause the processing circuitry to:
        read a message from the IVN,
        observe voltage transitions from multiple points on the communication bus of the IVN associated with the message,
        generate a waveform associated with the message based in part on the observed voltage transitions,
        determine whether the waveform matches a fingerprint waveform from a fingerprint, the fingerprint waveform associated with a one of the at least one ECU, and
        identify the ECU of the at least one ECU as sending the message via the IVN based on a determination that the waveform matches the fingerprint waveform.

11. The system of claim 10, the instructions when executed by the processing circuitry cause the processing circuitry to:
    compare the waveform to a plurality of fingerprint waveforms from the fingerprint, the plurality of fingerprint waveforms comprising the fingerprint waveform; and
    determine whether the waveform matches the fingerprint waveforms based on comparing the waveform to the plurality of fingerprint waveforms.

12. The system of claim 10, the waveform comprising a rising edge waveform, a falling edge waveform, or a steady state waveform.

13. The system of claim 10, the ECU identification sub-system comprising observation circuitry, the observation circuitry arranged to observe a first voltage transition at a first point on the communication bus and a second voltage transition at a second point on the communication bus.

14. The apparatus of claim 13, the instructions when executed by the processing circuitry cause the processing circuitry to combine the first voltage transition with the second voltage transition to generate the waveform.

15. The system of claim 10, the instructions when executed by the processing circuitry cause the processing circuitry to:
look up an ECU identification (ID) associated with the fingerprint waveform; and
identify the ECU of the at least one ECU based on the ECU ID.

16. The system of claim 10, the instructions when executed by the processing circuitry cause the processing circuitry to flag an unidentified ECU on the IVN based on a determination that the observed waveform does not match the fingerprint waveform.

17. A method, comprising:
reading a message from a communication bus of an in-vehicle network;
observing, via observation circuitry, voltage transitions associated with the message from multiple points of the communication bus;
generating a waveform based in part on the observed voltage transitions;
determining whether the waveform matches a fingerprint waveform from a fingerprint; and
identifying an electronic control unit (ECU) associated with the fingerprint waveform based on a determination that the waveform matches the fingerprint waveform.

18. The method of claim 17, comprising:
comparing the waveform to a plurality of fingerprint waveforms from the fingerprint, the plurality of fingerprint waveforms comprising the fingerprint waveform; and
determining whether the waveform matches the fingerprint waveforms based on comparing the waveform to the plurality of fingerprint waveforms.

19. The method of claim 17, the waveform comprising a rising edge waveform, a falling edge waveform, or a steady state waveform.

20. The method of claim 17, comprising:
observing, via observation circuitry, voltage at a first point on the communication bus; and
observing, via observation circuitry, voltage at a second point on the communication bus.

21. The method of claim 20, comprising:
identify a first voltage transition from the voltage observed at the first point;
identify a second voltage transition from the voltage observed at the second point; and
combine the first voltage transition with the second voltage transition to form the waveform.

22. The method of claim 17, comprising:
looking up an ECU identification (ID) associated with the fingerprint waveform; and
identifying the ECU based on the ECU ID.

23. The method of claim 22, the fingerprint comprising a plurality of fingerprint waveforms and an ECU ID for each of the plurality of fingerprint waveforms.

24. The method of claim 17, comprising flagging an unidentified ECU based on a determination that the observed waveform does not match the fingerprint waveform.

* * * * *